United States Patent
Yao et al.

(10) Patent No.: US 7,535,680 B2
(45) Date of Patent: May 19, 2009

(54) MICRO-ACTUATOR WITH INTEGRATED TRACE AND BONDING PAD SUPPORT

(75) Inventors: MingGao Yao, DongGuan (CN); Wei Ma, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 323 days.

(21) Appl. No.: 11/169,003

(22) Filed: Jun. 29, 2005

(65) Prior Publication Data

US 2007/0002500 A1   Jan. 4, 2007

(51) Int. Cl.
*G11B 5/56* (2006.01)
*G11B 21/20* (2006.01)

(52) U.S. Cl. .................................. 360/294.4
(58) Field of Classification Search ............... 360/294.4
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,538,836 B1 | 3/2003 | Dunfield et al. | |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,700,749 B2 | 3/2004 | Shiraishi et al. | |
| 6,930,860 B1 * | 8/2005 | Coffey | 360/294.4 |
| 6,934,127 B2 * | 8/2005 | Yao et al. | 360/294.4 |
| 6,950,266 B1 | 9/2005 | McCaslin et al. | |
| 6,950,288 B2 * | 9/2005 | Yao et al. | 360/294.4 |
| 7,051,424 B2 * | 5/2006 | Yao et al. | 29/603.06 |
| 7,159,300 B2 * | 1/2007 | Yao et al. | 29/603.03 |
| 2002/0051326 A1 * | 5/2002 | Shiraishi et al. | 360/294.4 |
| 2002/0141117 A1 * | 10/2002 | Kasajima et al. | 360/294.4 |
| 2002/0154450 A1 * | 10/2002 | Kasajima et al. | 360/294.4 |
| 2003/0147177 A1 | 8/2003 | Yao et al. | |
| 2003/0147181 A1 | 8/2003 | Shiraishi et al. | |
| 2003/0168935 A1 | 9/2003 | Ogawa et al. | |
| 2003/0231434 A1 * | 12/2003 | Mita et al. | 360/294.4 |
| 2004/0037008 A1 * | 2/2004 | Yao et al. | 360/294.3 |

(Continued)

FOREIGN PATENT DOCUMENTS

JP   2002-74871   3/2002

(Continued)

OTHER PUBLICATIONS

U.S. Appl. No. 11/238,998, filed Sep. 2005, Yang et al.

(Continued)

*Primary Examiner*—William J Klimowicz
(74) *Attorney, Agent, or Firm*—Nixon & Vanderhye P.C.

(57) ABSTRACT

A micro-actuator for a head gimbal assembly includes a frame, a first set of bonding pads provided to one end of the frame, a second set of bonding pads provided to an opposing end of the frame, and a trace integrated to the frame. The trace interconnects the first set of bonding pads and the second set of bonding pads.

37 Claims, 19 Drawing Sheets

U.S. PATENT DOCUMENTS

| | | | |
|---|---|---|---|
| 2004/0070887 A1* | 4/2004 | Yao et al. | 360/294.4 |
| 2004/0095684 A1* | 5/2004 | Yao et al. | 360/294.3 |
| 2004/0145834 A1* | 7/2004 | Miyano et al. | 360/294.4 |
| 2005/0152072 A1* | 7/2005 | Kwon et al. | 360/294.4 |
| 2005/0195531 A1* | 9/2005 | Yamazaki et al. | 360/294.4 |
| 2006/0023338 A1 | 2/2006 | Sharma et al. | |
| 2006/0050442 A1 | 3/2006 | Yao et al. | |
| 2006/0072247 A1 | 4/2006 | Yao et al. | |
| 2006/0082917 A1 | 4/2006 | Yao et al. | |
| 2006/0098347 A1 | 5/2006 | Yao et al. | |
| 2006/0146449 A1 | 7/2006 | Yao et al. | |

FOREIGN PATENT DOCUMENTS

JP        2002-133803        5/2002

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

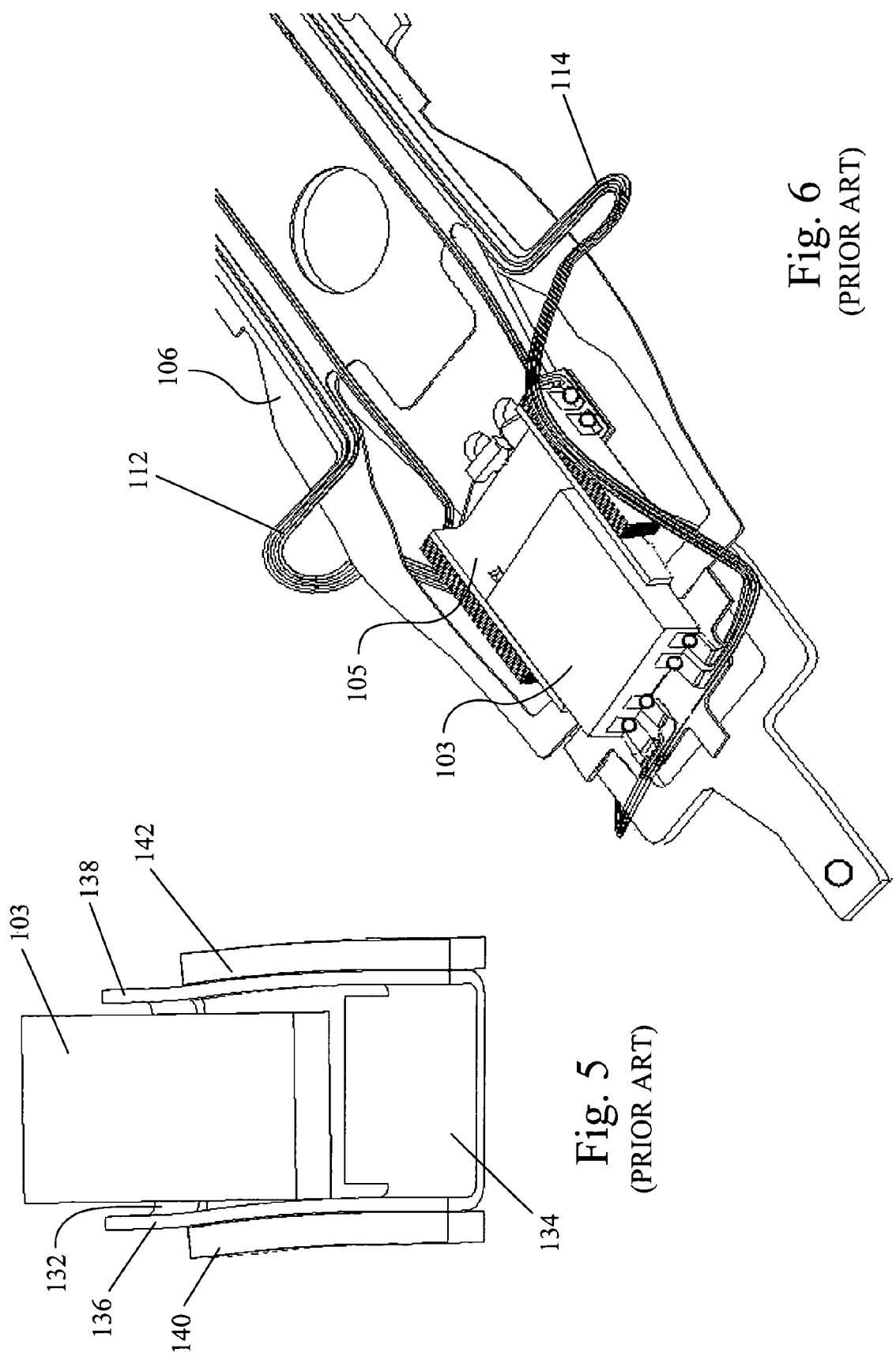

MICRO-ACTUATOR WITH INTEGRATED TRACE AND BONDING PAD SUPPORT

FIELD OF THE INVENTION

The present invention relates to information recording disk drive devices and, more particularly, to a micro-actuator for a head gimbal assembly (HGA) of the disk drive device. More specifically, the present invention is directed to a micro-actuator that is structured to reduce trace vibrations.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly."

FIG. 1 illustrates a conventional disk drive unit and show a magnetic disk 101 mounted on a spindle motor 102 for spinning the disk 101. A voice coil motor arm 104 carries a head gimbal assembly (HGA) 100 that includes a micro-actuator 105 with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write transducer, and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

FIG. 2 illustrates the head gimbal assembly (HGA) 100 of the conventional disk drive device of FIG. 1 incorporating a dual-stage actuator. However, because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and/or head suspension assembly. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

As shown in FIG. 2, the HGA 100 includes a suspension 106 having a flexure 108. The flexure 108 provides a suspension tongue 110 to load the PZT micro-actuator 105 and the slider 103. Two outwardly protruding traces 112, 114 are provided to the flexure 108 on opposite sides of the suspension tongue 110. Each of the traces 112, 114 has one end portion connected with a float plate 116 and another end portion connected with multi traces 118 that are electrically connected to bonding pads 120.

Referring to FIG. 3, a conventional PZT micro-actuator 105 includes a metal frame 130 which has a top support 132, a bottom support 134, and two side arms 136, 138 that interconnect the two supports 132 and 134. The side arms 136, 138 each have a PZT element 140, 142 attached thereto. The slider 103 is supported on the top support 132.

Referring to FIG. 4, the PZT micro-actuator 105 is physically coupled to the suspension tongue 110 by the bottom support 134 of the frame 130. The bottom support 134 may be mounted on the suspension tongue 110 by epoxy or laser welding, for example. Three electrical connection balls 150 (gold ball bonding or solder ball bonding, GBB or SBB) are provided to couple the PZT micro-actuator 105 to the suspension traces 118 located at the side of each PZT element 140, 142. In addition, there are four metal balls 152 (GBB or SBB) for coupling the slider 103 to the traces 118 for electrical connection of the read/write transducers. When power is supplied through the suspension traces 118, the PZT elements 140, 142 expand or contract to cause the two side arms 136, 138 to bend in a common lateral direction. The bending causes a shear deformation of the frame 130, e.g., the rectangular shape of the frame becomes approximately a parallelogram, which causes movement of the top support 132. This causes movement of the slider 103 connected thereto, thereby making the slider 103 move on the track of the disk in order to fine tune the position of the read/write head. In this manner, controlled displacement of slider 103 can be achieved for fine positional tuning.

FIG. 5 illustrates how the PZT micro-actuator 105 works when a voltage is applied to the PZT elements 140, 142. For example, when a positive sine voltage is input to the PZT element 140 of the micro-actuator which has a positive polarization, in the first half period, the PZT element 140 will shrink and cause the side arm 136 to deform as a water waveform shape. Since the slider 103 is mounted on the top support 132, this deformation will cause the slider to move towards the left side. Likewise, when a negative sine voltage is input to the PZT element 142 of the micro-actuator which has a positive polarization, in the second half period, the PZT element 142 will shrink and cause the side arm 138 to deform as a water waveform shape. This deformation will cause the slider 103 to move towards the right side. Of course, this operation may depend on the electric control circle and PZT element polarization direction, but the work principle is well known.

Referring to FIG. 6, two outwardly protruding traces 112, 114 have to be used to electrically connect the multi-traces 118 with the float plate 116 which is electrically connected with the slider 103. In order to reduce the trace resistance due to stiffness of the trace and maintain the micro-actuator function during operation, the traces 112, 114 are shaped so as to curve and extend on opposite sides of the suspension tongue 110. This arrangement allows the traces 112, 114 to vibrate and move when the micro-actuator is operated during head seeking or settling operations in the disk drive device, which will cause the slider to be off-track. For a high RPM multiplate disk drive device, the outwardly curved traces 112, 114 will also cause a windage problem as air flow hits the traces or suspension. Both of these issues will cause slider PES (positional error signal) and NRRO (non-repeatable runout) performance to worsen, which will limit the capacity and performance of the disk drive device.

For example, FIG. 6 illustrates the motion of the traces 112, 114 when the micro-actuator 105 is operated. As illustrated, when a voltage is input to the micro-actuator 105, movement of the side arms 136, 138 may cause the trace 112 to sway to the back side of the suspension 106 and the other trace 114 to sway to the top side of the slider 103. This kind of motion will cause a suspension resonance motion, which is one of the sources that causes the slider to be off-track.

FIG. 7 illustrates trace motion displacement results for a prior art design when the micro-actuator is operated. As discussed above, the prior art design includes outwardly protruding traces 112, 114. The displacement of the traces is measured against the frequency. As illustrated, the displacement trend includes three peaks 160 (e.g., at 4 Khz, 6.3 kHz, and 8.5 Khz).

FIG. 8 illustrates related measurement data of the slider head NRRO performance for a prior art design. As illustrated, the peaks 170 show a slider head off track percentage with a different frequency. This shows a relatively large off track due to the trace motion.

Thus, there is a need for an improved system that does not suffer from the above-mentioned drawbacks.

SUMMARY OF THE INVENTION

One aspect of the present invention relates to a micro-actuator structured to reduce trace vibrations.

Another aspect of the invention relates to a micro-actuator having a frame with an integrated trace and bonding pad support.

Another aspect of the invention relates to a micro-actuator for a head gimbal assembly. The micro-actuator includes a frame, a first set of bonding pads provided to one end of the frame, a second set of bonding pads provided to an opposing end of the frame, and a trace integrated to the frame. The trace interconnects the first set of bonding pads and the second set of bonding pads.

Another aspect of the invention relates to a micro-actuator for a head gimbal assembly. The micro-actuator includes a bottom support adapted to be connected to a suspension of the head gimbal assembly, a top support adapted to support a slider of the head gimbal assembly, a pair of side arms that interconnect the bottom support and the top support, and a PZT element mounted to each of the side arms. Each PZT element is excitable to cause selective movement of the side arms which causes movement of the top support to cause movement of the slider. A bonding pad support is integrated to and extends from the top support. The bonding pad support includes slider bonding pads adapted to be electrically bonded with respective pads provided on the slider.

Yet another aspect of the invention relates to a head gimbal assembly including a micro-actuator, a slider, and a suspension that supports the micro-actuator and the slider. The micro-actuator includes a bottom support connected to the suspension by one of welding or epoxy bonding, a top support to support the slider, a pair of side arms that interconnect the bottom support and the top support, and a PZT element mounted to each of the side arms. Each PZT element is excitable to cause selective movement of the side arms which causes movement of the top support to cause movement of the slider. A bonding pad support is integrated to and extends from the top support. The bonding pad support includes slider bonding pads that are electrically bonded with respective pads provided on the slider.

Yet another aspect of the invention relates to a disk drive device. The disk drive device includes a head gimbal assembly including a micro-actuator, a slider, and a suspension that supports the micro-actuator and slider; a drive arm connected to the head gimbal assembly; a disk; and a spindle motor operable to spin the disk. The micro-actuator includes a bottom support connected to the suspension by one of welding or epoxy bonding, a top support to support the slider, a pair of side arms that interconnect the bottom support and the top support, and a PZT element mounted to each of the side arms. Each PZT element is excitable to cause selective movement of the side arms which causes movement of the top support to cause movement of the slider. A bonding pad support is integrated to and extends from the top support. The bonding pad support includes slider bonding pads that are electrically bonded with respective pads provided on the slider.

Still another aspect of the invention relates to a micro-actuator frame for a head gimbal assembly. The micro-actuator frame includes a bottom support adapted to be connected to a suspension of the head gimbal assembly, a top support adapted to support a slider of the head gimbal assembly, a pair of side arms that interconnect the bottom support and the top support, a first set of bonding pads provided to the bottom support and a second set of bonding pads provided to the top support, and a trace integrated to the frame and laminated between the side arms. The trace interconnects the first set of bonding pads and the second set of bonding pads.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 5 is a top view of the slider and PZT micro-actuator of the HGA shown in FIG. 2 in use;

FIG. 6 is a partial perspective view of the HGA shown in FIG. 2 in use;

DETAILED DESCRIPTION OF ILLUSTRATED EMBODIMENTS

Figure 1:
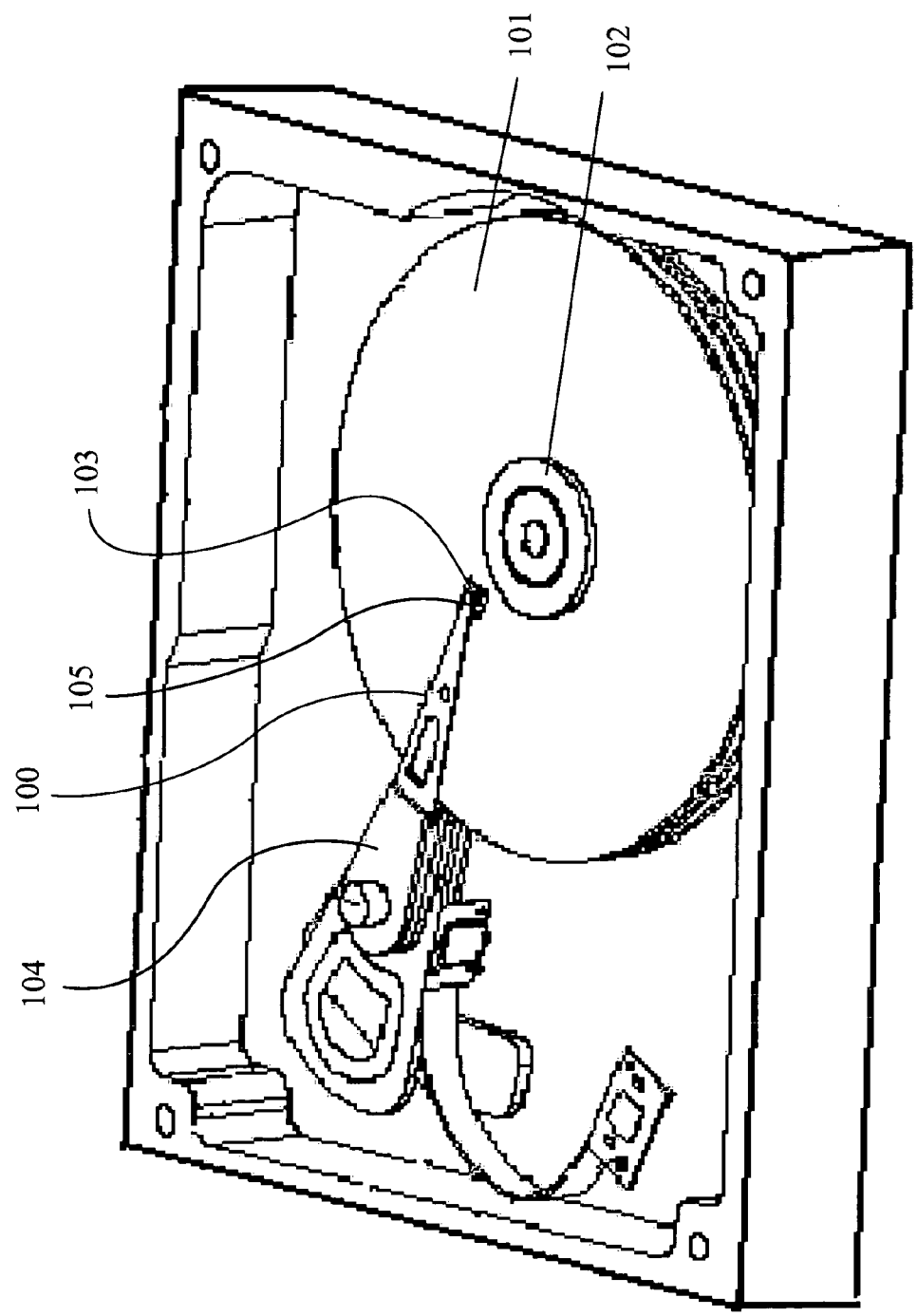
FIG. 1 is a perspective view of a conventional disk drive unit.
Figure 2:
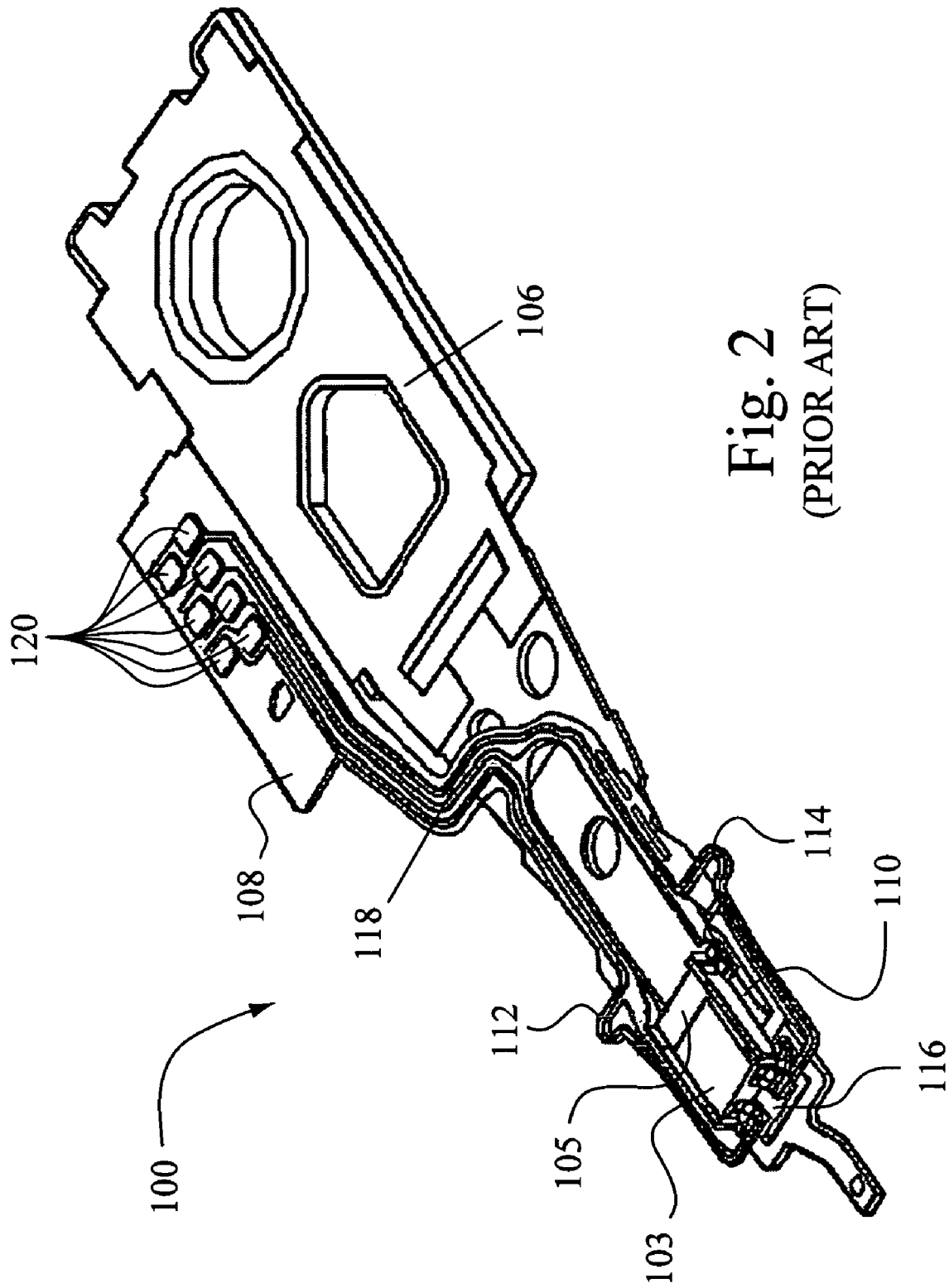
FIG. 2 is a perspective view of a conventional head gimbal assembly (HGA)
Figure 4:
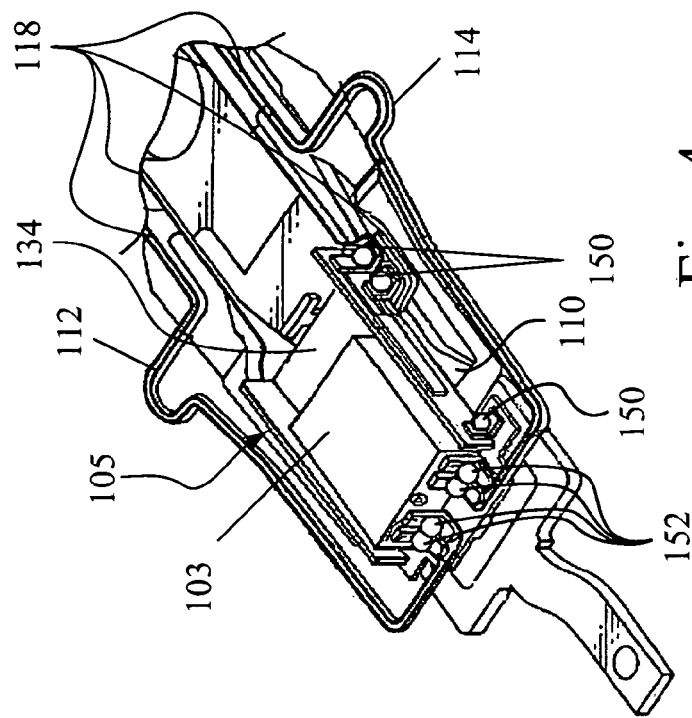
FIG. 4 is a partial perspective view of the HGA shown in FIG. 2.
Figure 3:
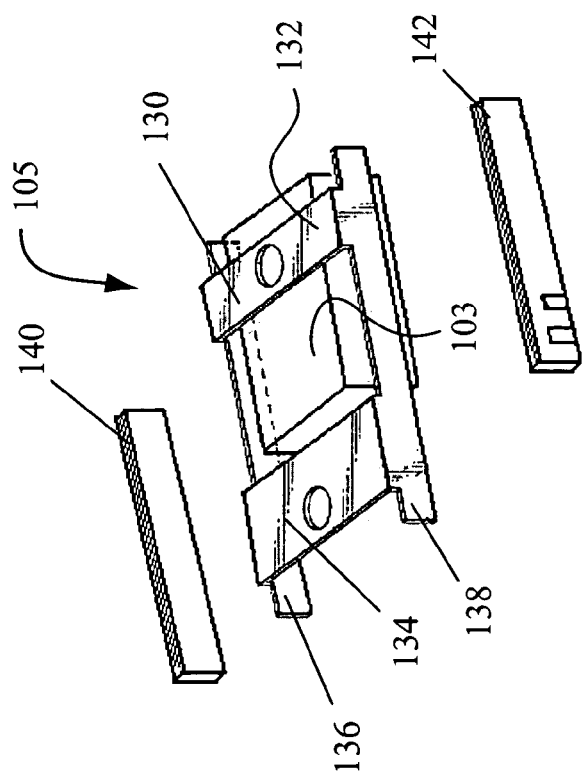
FIG. 3 is a perspective view of a slider and PZT micro-actuator of the HGA shown in FIG. 2.

Various preferred embodiments of the instant invention will now be described with reference to the figures, wherein like reference numerals designate similar parts throughout the various views. As indicated above, the instant invention is designed to reduce trace vibrations in a head gimbal assembly (HGA) while precisely actuating the slider using the micro-actuator. An aspect of the instant invention is to provide a micro-actuator that includes an integrated trace and bonding pad support configured to reduce trace vibrations in the HGA. By reducing the trace vibrations in the HGA, the performance characteristics of the device are improved.

Several example embodiments of a micro-actuator for a HGA will now be described. It is noted that the micro-actuator may be implemented in any suitable disk drive device having a micro-actuator in which it is desired to reduce trace vibrations, regardless of the specific structure of the HGA as illustrated in the figures. That is, the invention may be used in any suitable device having a micro-actuator in any industry.

FIGS. 9-12 illustrates a head gimbal assembly (HGA) 210 incorporating a PZT micro-actuator 212 according to a first exemplary embodiment of the present invention. The HGA 210 includes a PZT micro-actuator 212, a slider 214, and a suspension 216 to load or suspend the PZT micro-actuator 212 and the slider 214.

As illustrated, the suspension 216 includes a base plate 218, a load beam 220, a hinge 222, a flexure 224, and inner and outer suspension traces 226, 227 in the flexure 224. The base plate 218 includes a mounting hole 228 for use in connecting the suspension 216 to a drive arm of a voice coil motor (VCM) of a disk drive device. The shape of the base plate 218 may vary depending on the configuration or model of the disk drive device. Also, the base plate 218 is constructed of a relatively hard or rigid material, e.g., metal, to stably support the suspension 216 on the drive arm of the VCM.

The hinge 222 is mounted onto the base plate 218 and load beam 220, e.g., by welding. As illustrated, the hinge 222 includes a hole 230 that align with the hole 228 provided in the base plate 218. Also, the hinge 222 includes a holder bar 232 for supporting the load beam 220.

The load beam 220 is mounted onto the holder bar 232 of the hinge 222, e.g., by welding. The load beam 220 has a dimple 234 formed thereon for engaging the flexure 224 (see FIG. 12). The load beam 220 functions as a spring or shock absorber to buffer the suspension 216 from the slider 214. An optional lift tab 236 may be provided on the load beam 220 to lift the HGA 210 from the disk when the disk is not rotated.

The flexure 224 is mounted to the hinge 222 and the load beam 220, e.g., by lamination or welding. The flexure 224 provides a suspension tongue 238 to couple the PZT micro-actuator 212 to the suspension 216 (see FIG. 11). The suspension tongue 238 engages the dimple 234 on the load beam 220. Also, the suspension traces 226, 227 are provided on the flexure 224 to electrically connect a plurality of connection pads 240 (which connect to an external control system) with the slider 214 and the PZT elements 242 on the PZT micro-actuator 212. The suspension traces 226, 227 may be a flexible printed circuit (FPC) and may include any suitable number of lines.

Figure 10:
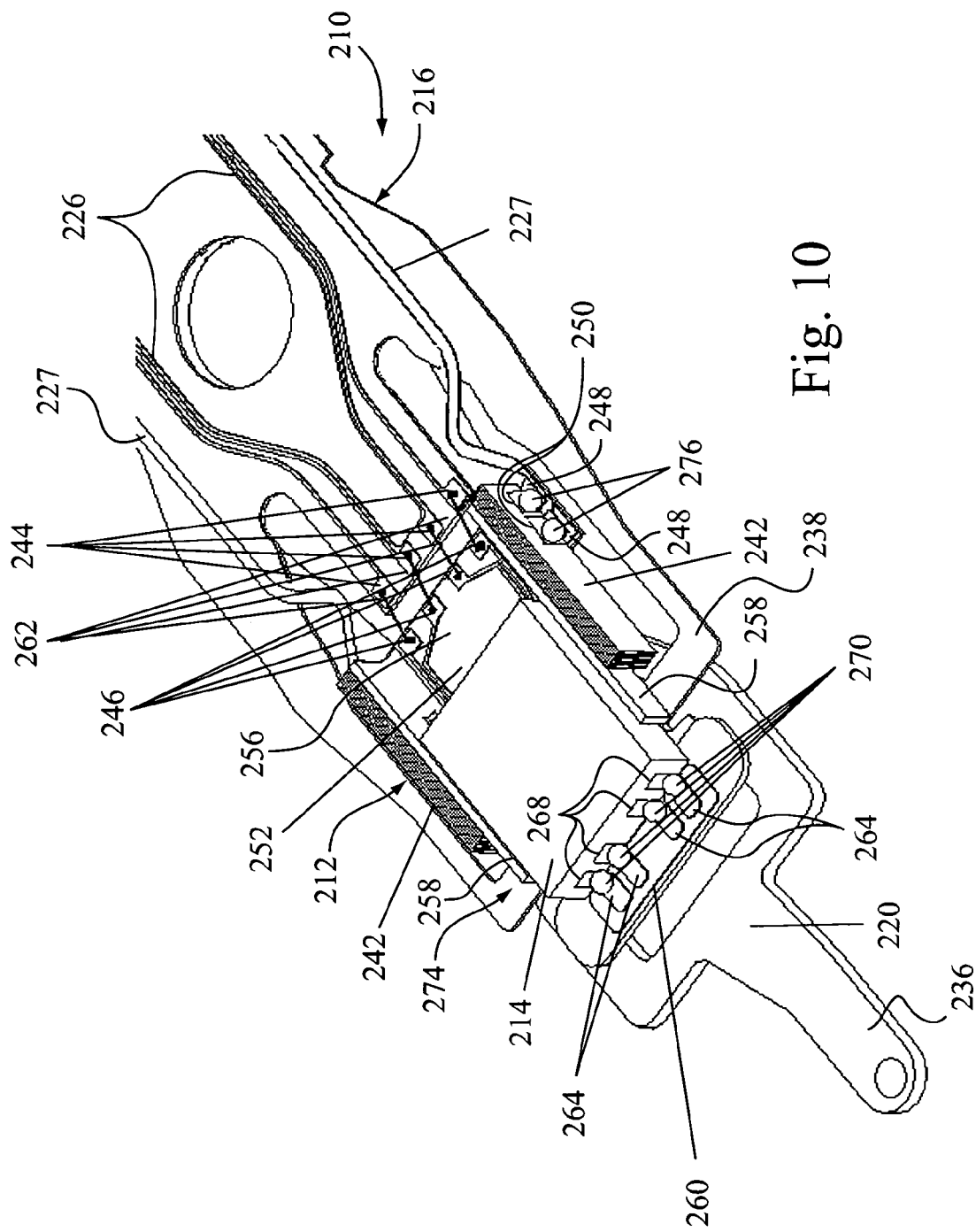
FIG. 10 is a partial perspective of the HGA shown in FIG. 9.
Figure 11:
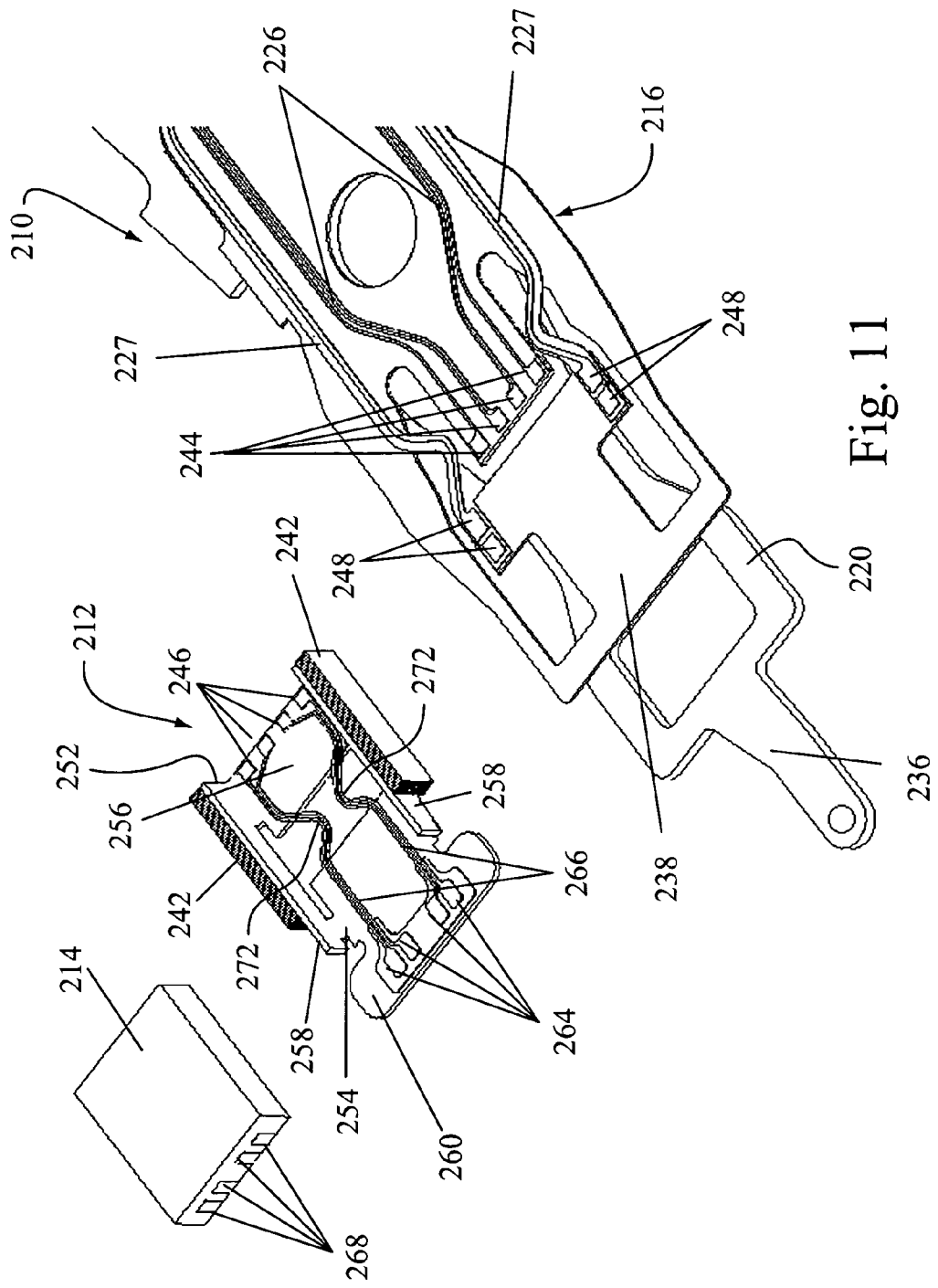
FIG. 11 is an exploded view of the HGA shown in FIG. 10.

As best shown in FIGS. 10 and 11, bonding pads 244 are directly connected to the inner suspension traces 226 to electrically connect the inner suspension traces 226 with bonding pads 246 provided on the frame of the PZT micro-actuator 212, which is electrically connected to the slider 214. Also, bonding pads 248 are directly connected to the outer suspension traces 227 to electrically connect the outer suspension traces 227 with bonding pads 250 provided on the PZT elements 242.

A voice-coil motor (VCM) is provided in the disk drive device for controllably driving the drive arm and, in turn, the HGA 210 in order to enable the HGA 210 to position the slider 214, and associated read/write head, over any desired information track on a disk in the disk drive device. The PZT micro-actuator 212 is provided to enable faster and finer positional control for the device, as well as to reduce the head seeking and settling time during operation. Thus, when the HGA 210 is incorporated into a disk drive device, a dual-stage actuator system is provided in which the VCM actuator provides large positional adjustments and the PZT micro-actuator 212 provides fine positional adjustments for the read/write head.

FIG. 11 illustrates the PZT micro-actuator 212 and slider 214 removed from the suspension 216. As illustrated, the PZT micro-actuator 212 includes a micro-actuator frame 252 and PZT elements 242 mounted to the micro-actuator frame 252. The micro-actuator frame 252 includes a top support 254, a bottom support 256, side arms 258 that interconnect the top support 254 and bottom support 256, and a bonding pad support 260 that extends from the top support 254. The micro-actuator frame 252 may be constructed of any suitable material, e.g., metal, and may be constructed using any suitable process.

Figure 12:
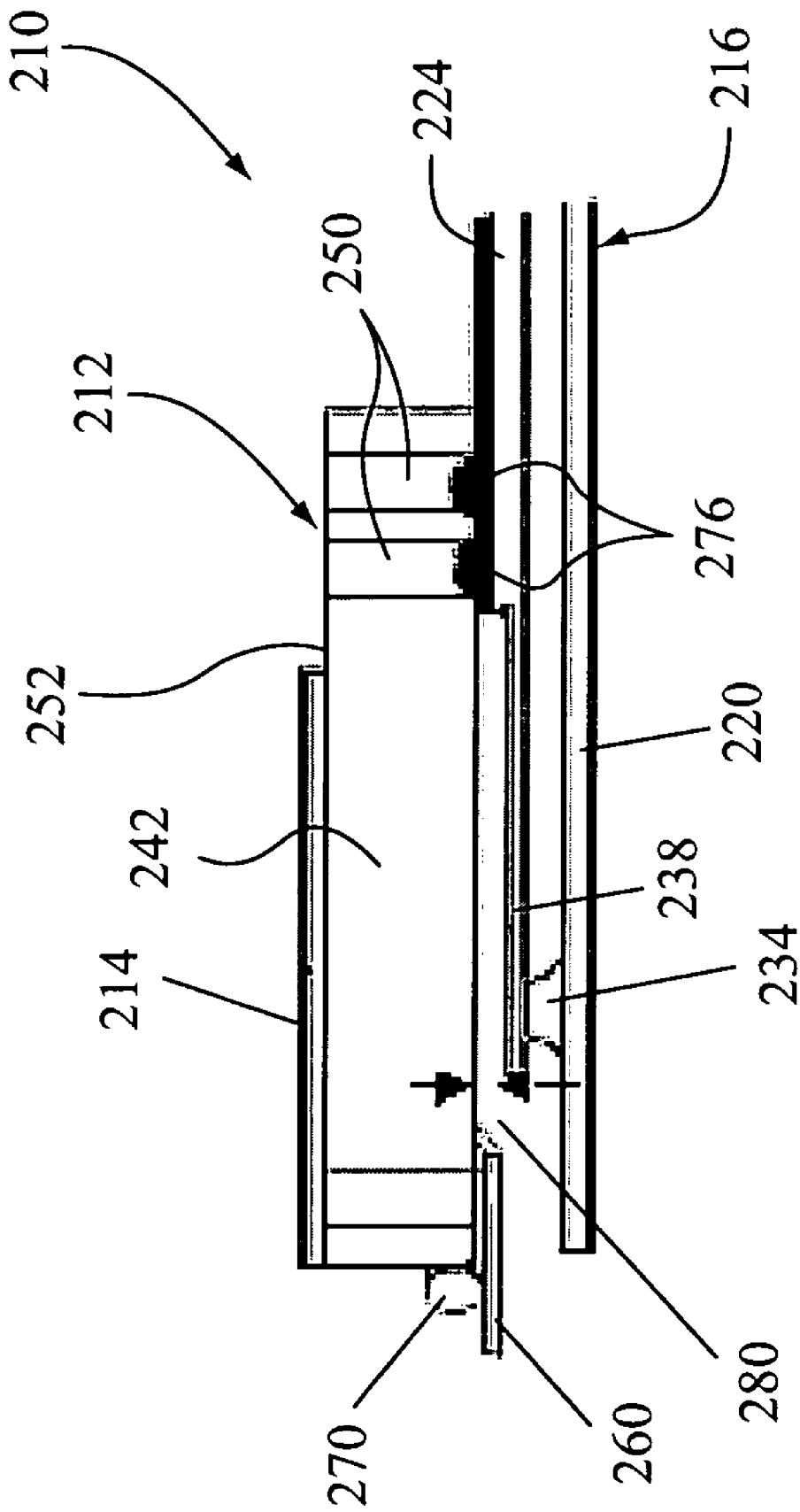
FIG. 12 is a side view of the HGA shown in FIG. 10.

As best shown in FIG. 10, the bottom support 256 is structured to connect the micro-actuator frame 252 to the suspension 216. Specifically, the bottom support 256 is partially mounted to the suspension tongue 238 of the flexure 224, e.g., by epoxy, resin, or welding by laser. Also, suspension bonding pads 246, e.g., four bonding pads, are provided on the bottom support 256. The suspension bonding pads 246 are electrically coupled by electric connections 262 with respective bonding pads 244 provided on the suspension 216, e.g., by wire bonding. This connects the bottom support 256 to the suspension 216 and electrically connects the micro-actuator frame 252 with the inner suspension traces 226. Also, a parallel gap 280 is provided between the suspension tongue 238 and the PZT micro-actuator 212 to allow the PZT micro-actuator 212 to move freely in use, as shown in FIG. 12.

The top support 254 is structured to connect the micro-actuator frame 252 to the slider 214. Specifically, slider bonding pads 264, e.g., four bonding pads, are provided on the bonding pad support 260 extending from the top support 254. As shown in FIG. 11, the slider bonding pads 264 are electrically connected to the suspension bonding pads 246 through traces 266 integrated into the frame 252. The slider 214 has bonding pads 268, e.g., four bonding pads, on an end thereof corresponding to the slider bonding pads 264 of the bonding pad support 260. The top support 254 supports the slider 214 thereon and the slider bonding pads 264 of the bonding pad support 260 are electrically bonded with respective pads 268 provided on the slider 214 using, for example, electric connection balls (GBB or SBB) 270 (see FIGS. 10 and 12). This connects the top support 254 to the slider 214 and electrically connects the slider 214 and its read/write elements to the inner suspension traces 226 on the suspension 216.

In the illustrated embodiment, the trace 266 includes four lines between the four slider bonding pads 264 and the four suspension bonding pads 246. However, any suitable number of pads and trace lines may be used. Also, as best shown in FIG. 11, intermediate portions 272 of opposing trace lines curve inwardly towards one another. However, the trace lines may have any suitable configuration.

The side arms 258 interconnect the top support 254 and the bottom support 256. A PZT element 242 is mounted to each of the side arms 258 of the nicro-actuator frame 252 to provide the PZT micro-actuator 112. Each PZT element 242 has a plate-like shape and may be formed by laminated thin films consisting of piezoelectric material such as PZT and Ni—Ag or Pt or gold metal as electrode. In another embodiment, the PZT element 242 may be a ceramic PZT with a single layer or a multi-layer. However, one or more PZT elements 242 may be mounted to the side arms 258 in any suitable manner.

A slider 214 is mounted to the PZT micro-actuator 212 to provide a slider and PZT micro-actuator assembly 274. The slider 214 is mounted to the PZT micro-actuator 212 as shown in FIG. 10. As explained above, the slider 214, incorporating the read/write head, is electrically bonded to the slider bonding pads 264 of the micro-actuator frame 252 by electrical connection balls (GBB or SBB) 270.

The slider and PZT micro-actuator assembly 274 is electrically connected to the suspension 216 of the HGA 210. As explained above, electrical connections 262 are provided to electrically connect the suspension bonding pads 246 on the bottom support 256 of the micro-actuator frame 252 to the bonding pads 244 bonded to the inner suspension traces 226 provided on the suspension 216. In addition, the PZT elements 242 provided on the PZT micro-actuator 212 are electrically connected to the outer suspension traces 227. Specifically, the bonding pads 250, e.g., two bonding pads, provided on the PZT elements 242 are electrically connected to the bonding pads 248, e.g., two bonding pads, on the outer suspension traces 227 using electrical connection balls (GBB or SBB) 276. This allows power to be applied via the outer suspension traces 227 to the PZT elements 242.

In use, the PZT elements 242 are excited, e.g., by applying voltage thereto, to selectively cause expansion or contraction thereof. The PZT micro-actuator 212 is configured such that expansion or contraction of the PZT elements 242 causes movement of the side arms 258, which causes movement of the top support 254, which, in turn, causes movement of the slider 214 coupled thereto.

Because the trace 266 and the bonding pad support 260 are integrated into the micro-actuator frame 252, these components are not subject to excessive vibration when the PZT micro-actuator 212 is operated. By reducing the trace vibrations in the HGA, the performance characteristics of the disk drive device are improved. Moreover, PZT micro-actuator 212 with integrated trace 266 and bonding pad support 260 improves the process yield as these components are not easily deformed during the manufacture of the suspension, HGA, and disk drive device.

Figure 7:
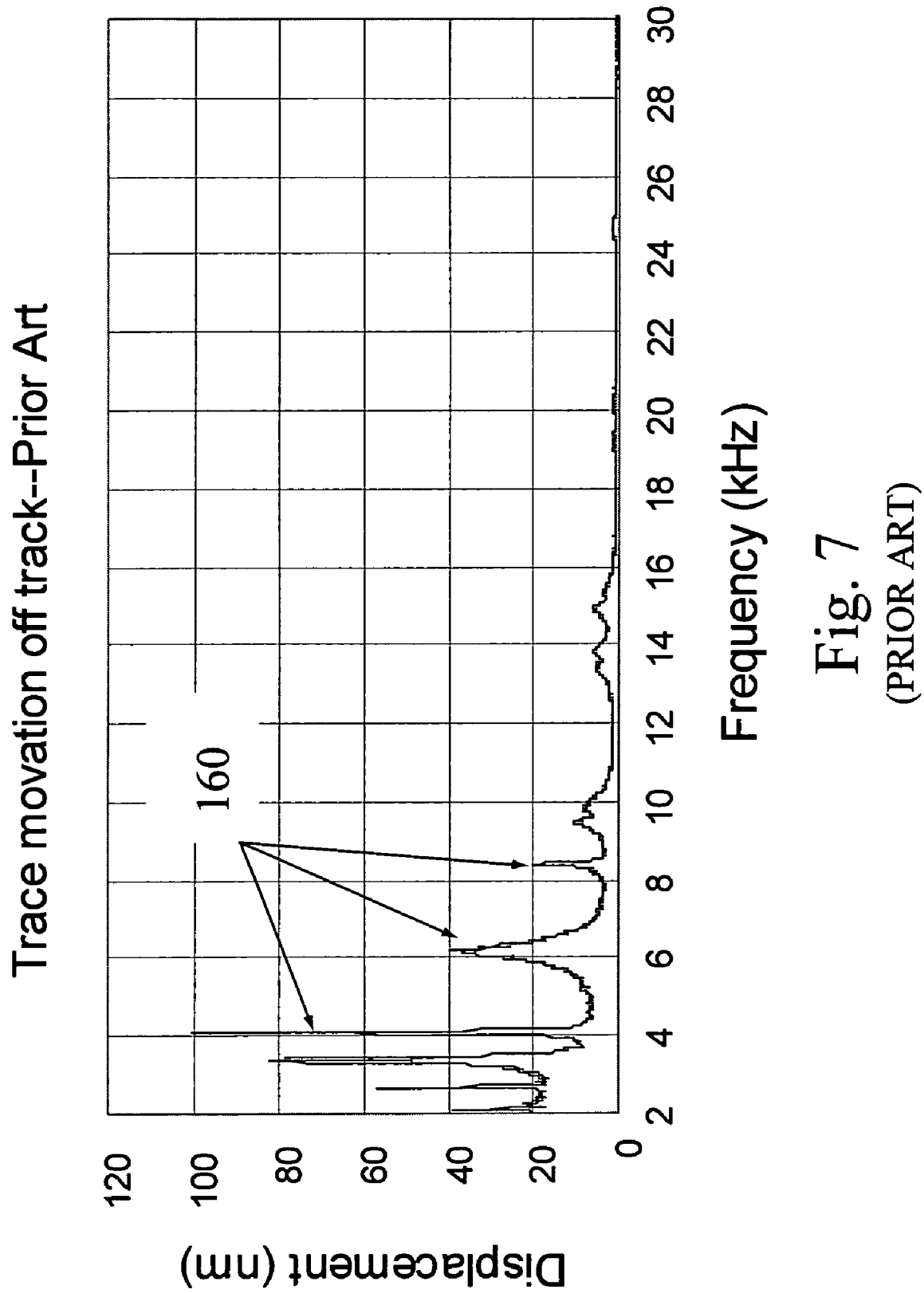
FIG. 7 shows trace motion displacement results for a prior art design.
Figure 13:
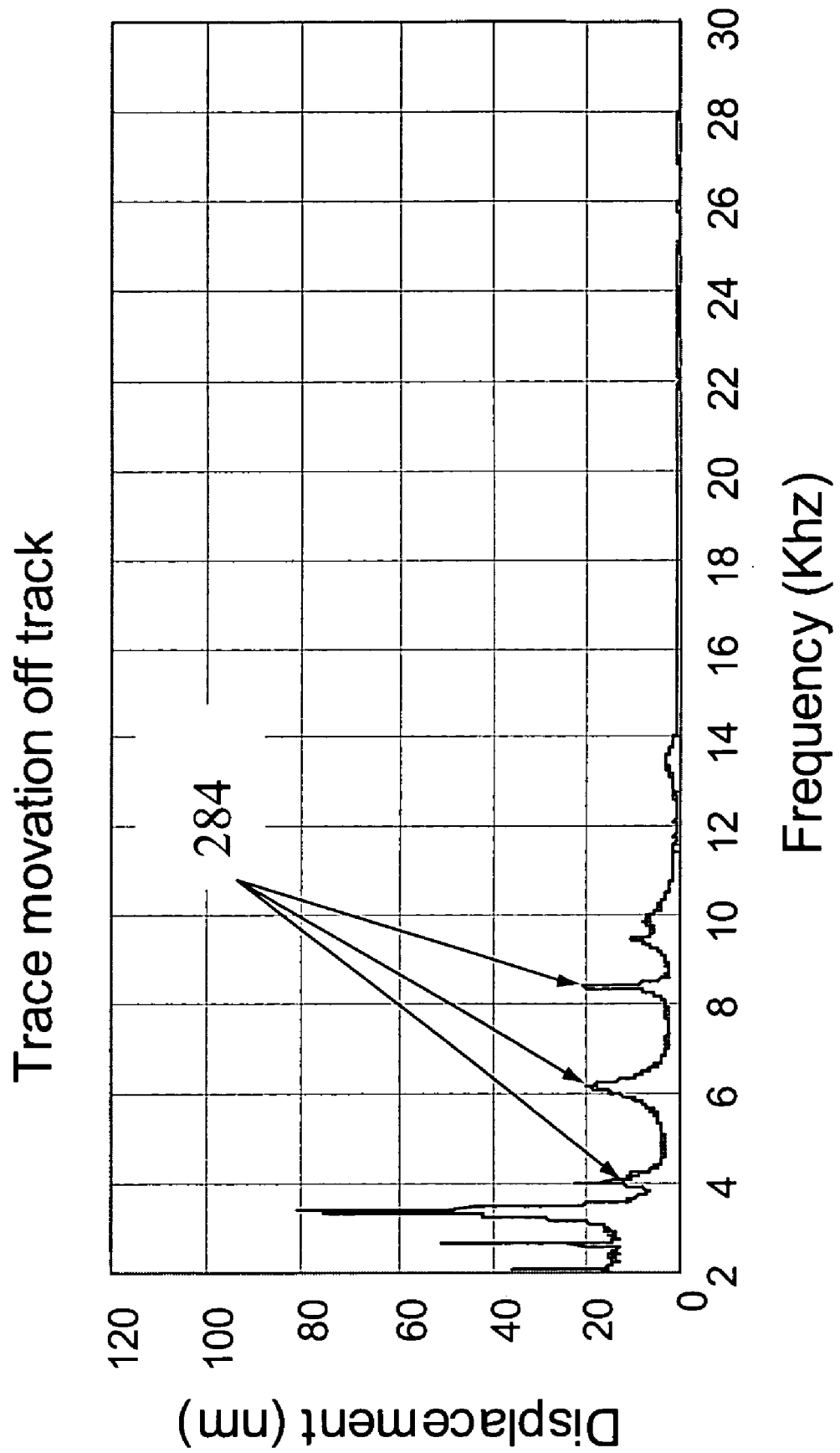
FIG. 13 shows trace motion displacement results for the HGA shown in FIG. 9.

FIG. 13 illustrates trace motion displacement results when the PZT micro-actuator 212 is operated. When compared to the results of the prior art design in FIG. 7, the three peaks 284 of FIG. 13 are improved with respect to the three peaks 160 of FIG. 7 (e.g., at 4 Khz, 6.3 kHz, and 8.5 Khz ).

Figure 8:
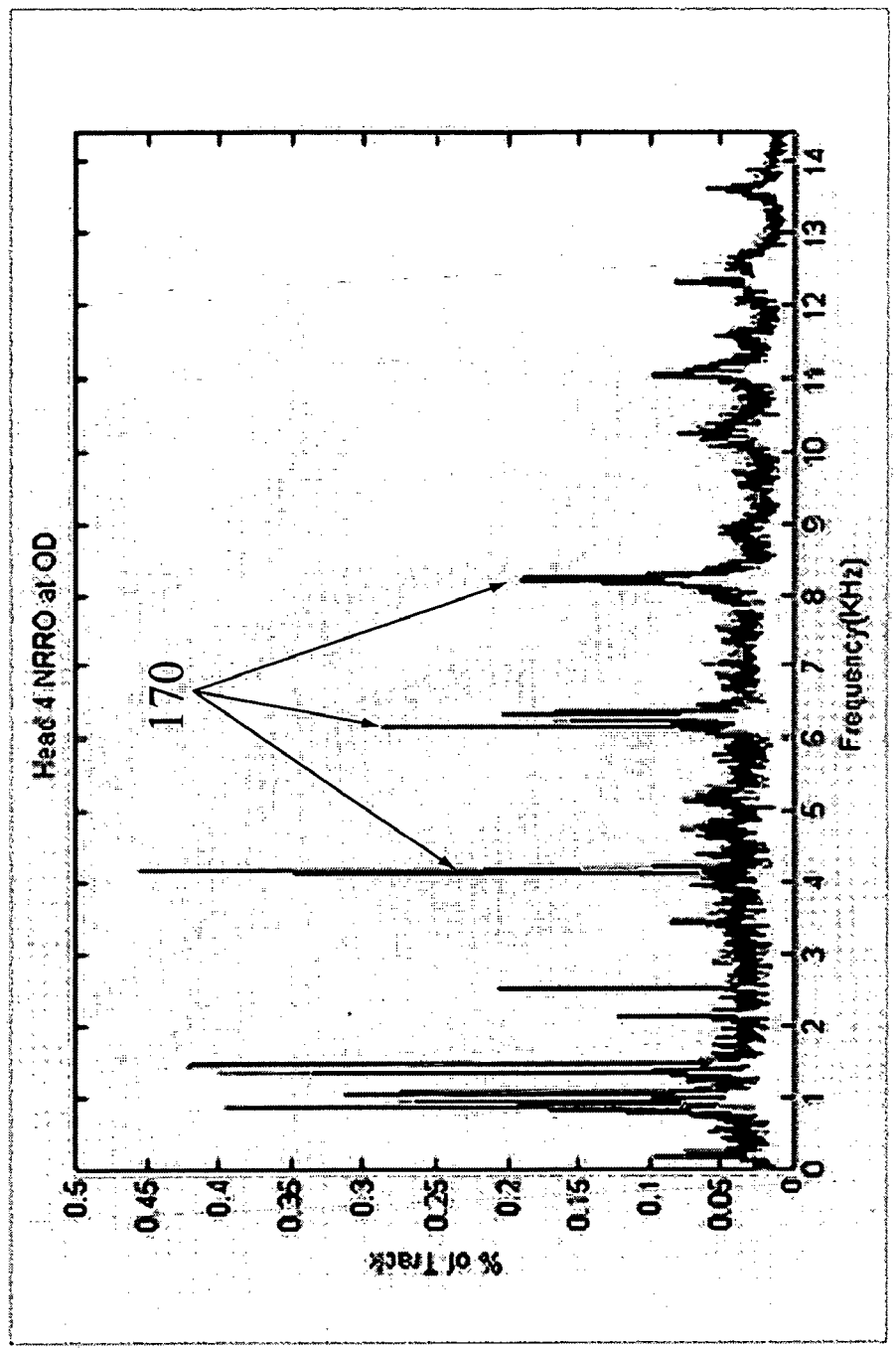
FIG. 8 shows slider head NRRO performance for a prior art design.
Figure 9:
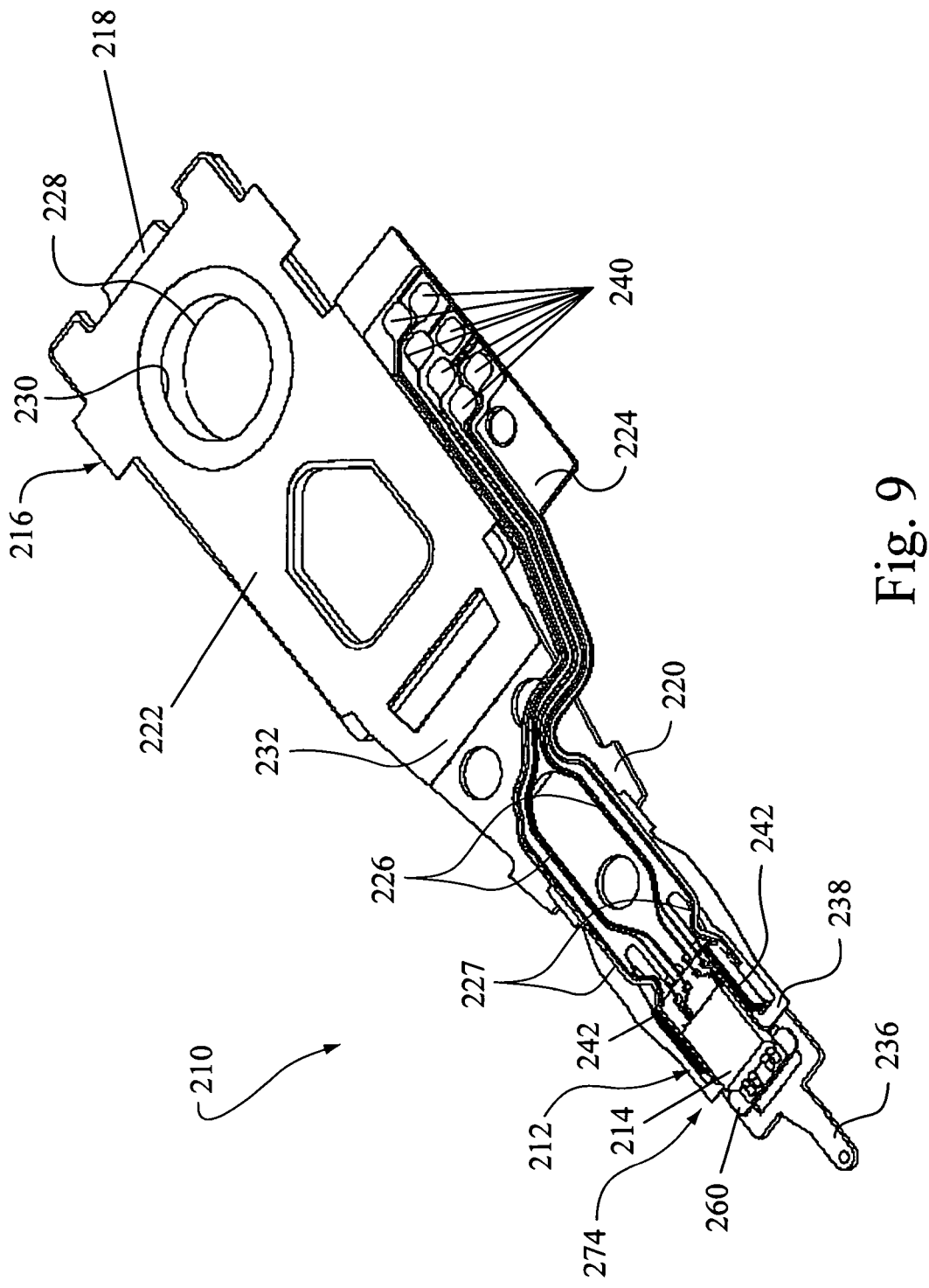
FIG. 9 is a perspective view of a head gimbal assembly (HGA) including a PZT micro-actuator according to an embodiment of the present invention.
Figure 14:
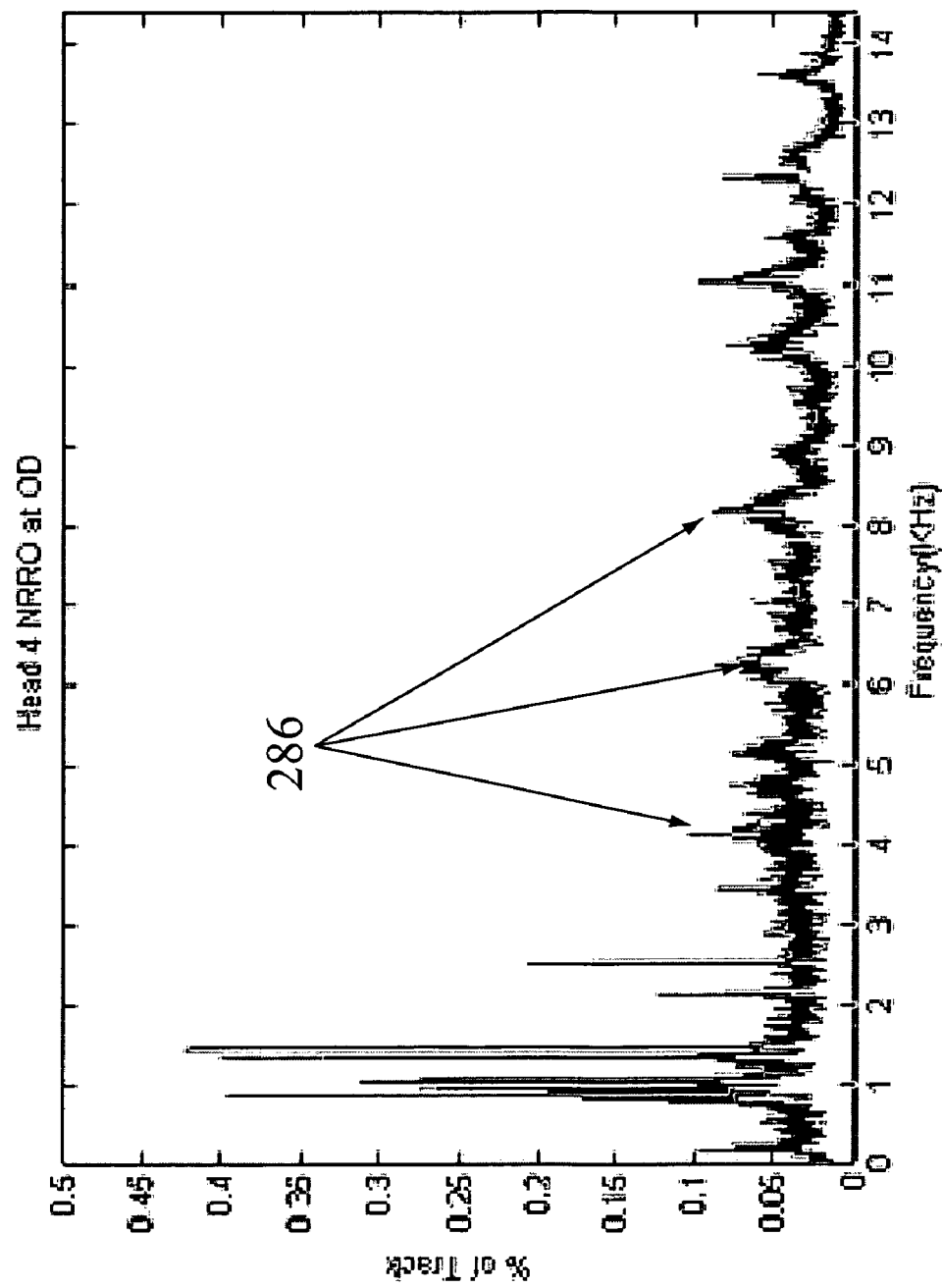
FIG. 14 shows slider head NRRO performance for the HGA shown in FIG. 9.

FIG. 14 illustrates testing data of slider head NRRO performance for the PZT micro-actuator 212. When compared to the results of the prior art design in FIG. 8, the peaks 286 of FIG. 14 are improved with respect to the peaks 170 of FIG. 8.

Figure 15:
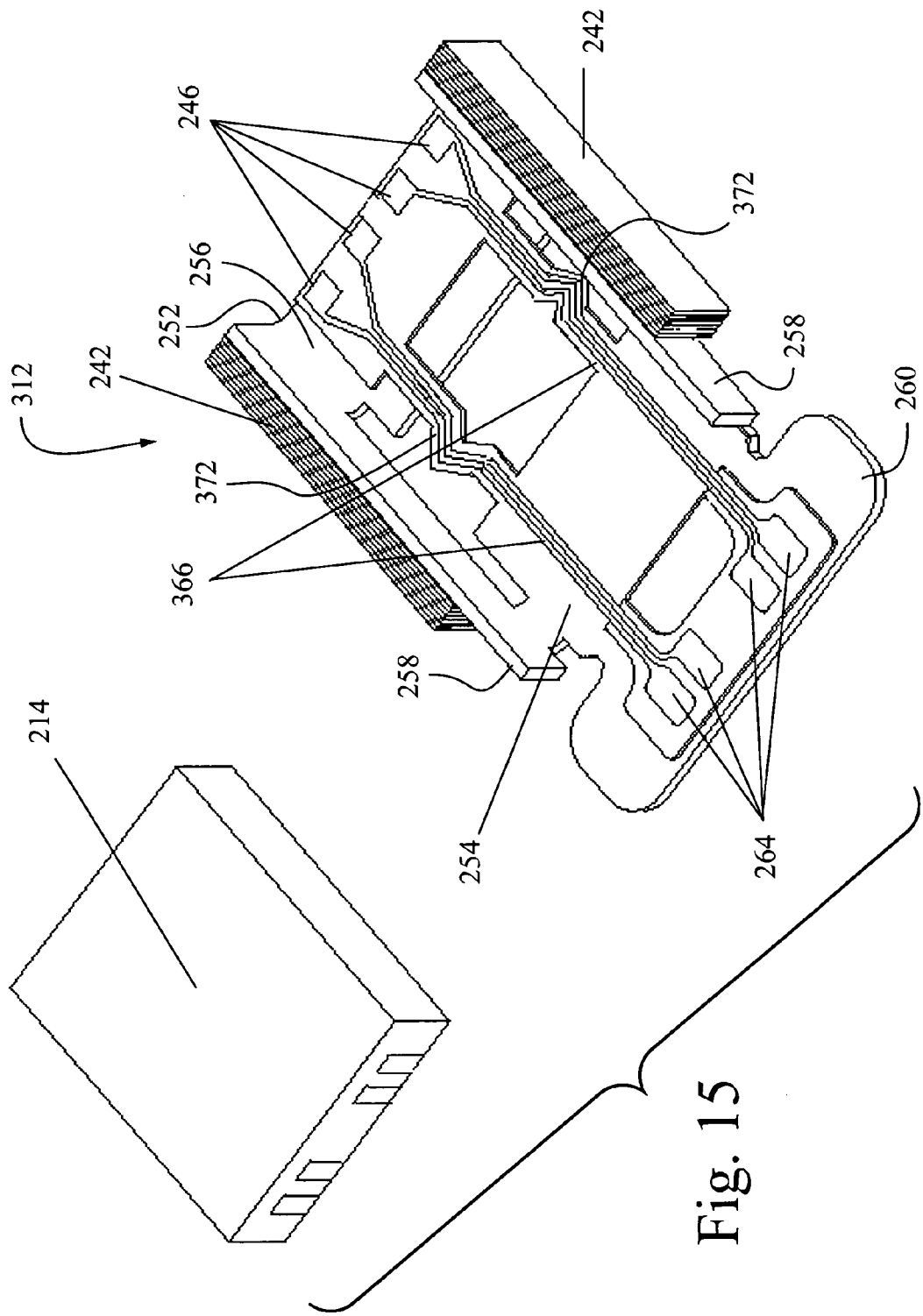
FIG. 15 is a perspective view of a slider and a PZT micro-actuator according to another embodiment of the present invention.

As noted above, the trace lines interconnecting the slider bonding pads 264 and the suspension bonding pads 246 may have any suitable configuration. For example, FIG. 15 illustrates a PZT micro-actuator 312 according to another exemplary embodiment of the present invention. In this embodiment, intermediate portions 372 of opposing trace lines of the traces 366 curve outwardly away from one another. The remaining components of the PZT micro-actuator 312 are substantially similar to the PZT micro-actuator 212 and indicated with similar reference numerals.

Figure 16:
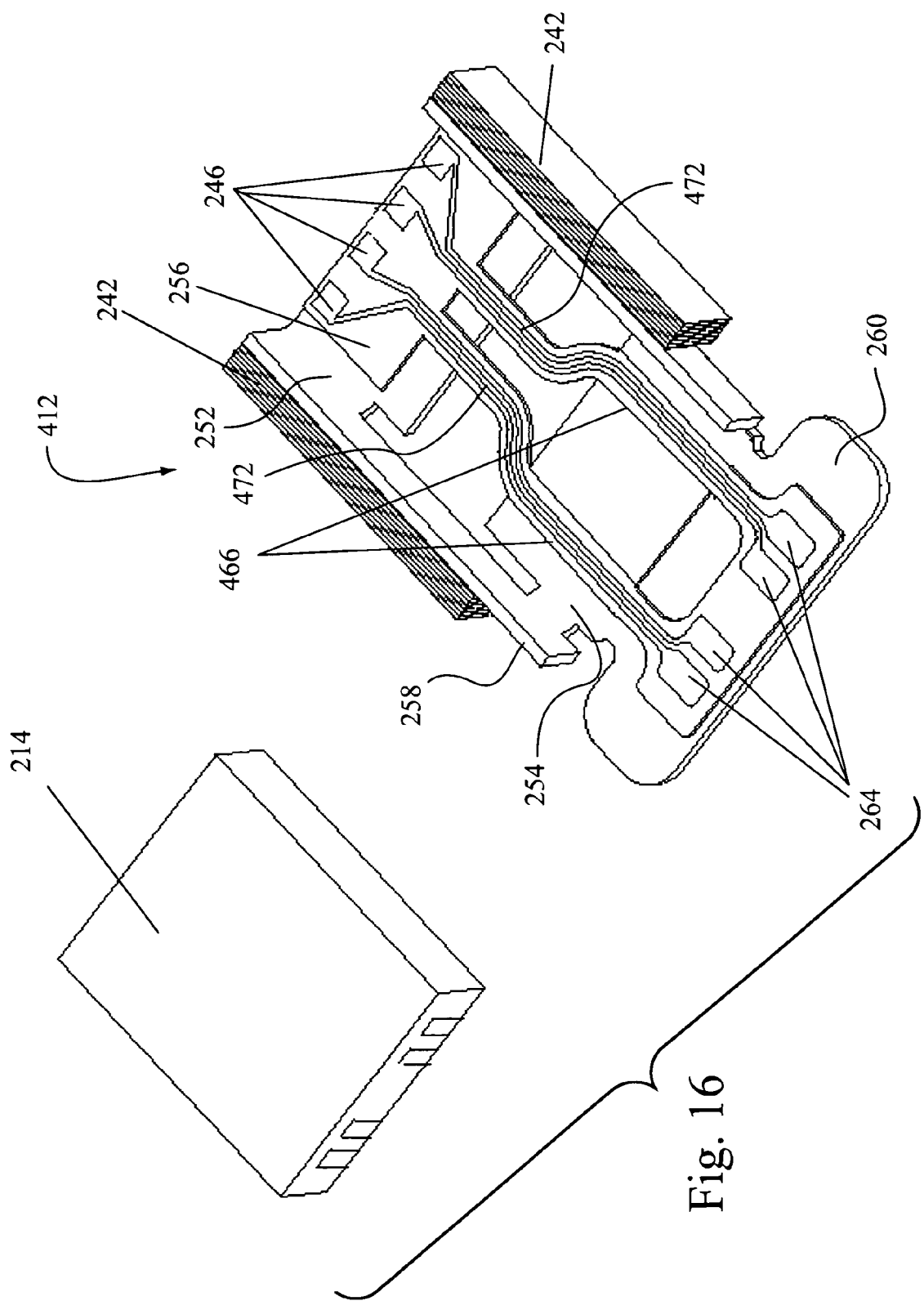
FIG. 16 is a perspective view of a slider and a PZT micro-actuator according to another embodiment of the present invention.

FIG. 16 illustrates a PZT micro-actuator 412 according to another exemplary embodiment of the present invention. In this embodiment, end portions 472 of opposing trace lines of the traces 466 curve inwardly towards one another. The remaining components of the PZT micro-actuator 412 are substantially similar to the PZT micro-actuator 212 and indicated with similar reference numerals.

Figure 17:
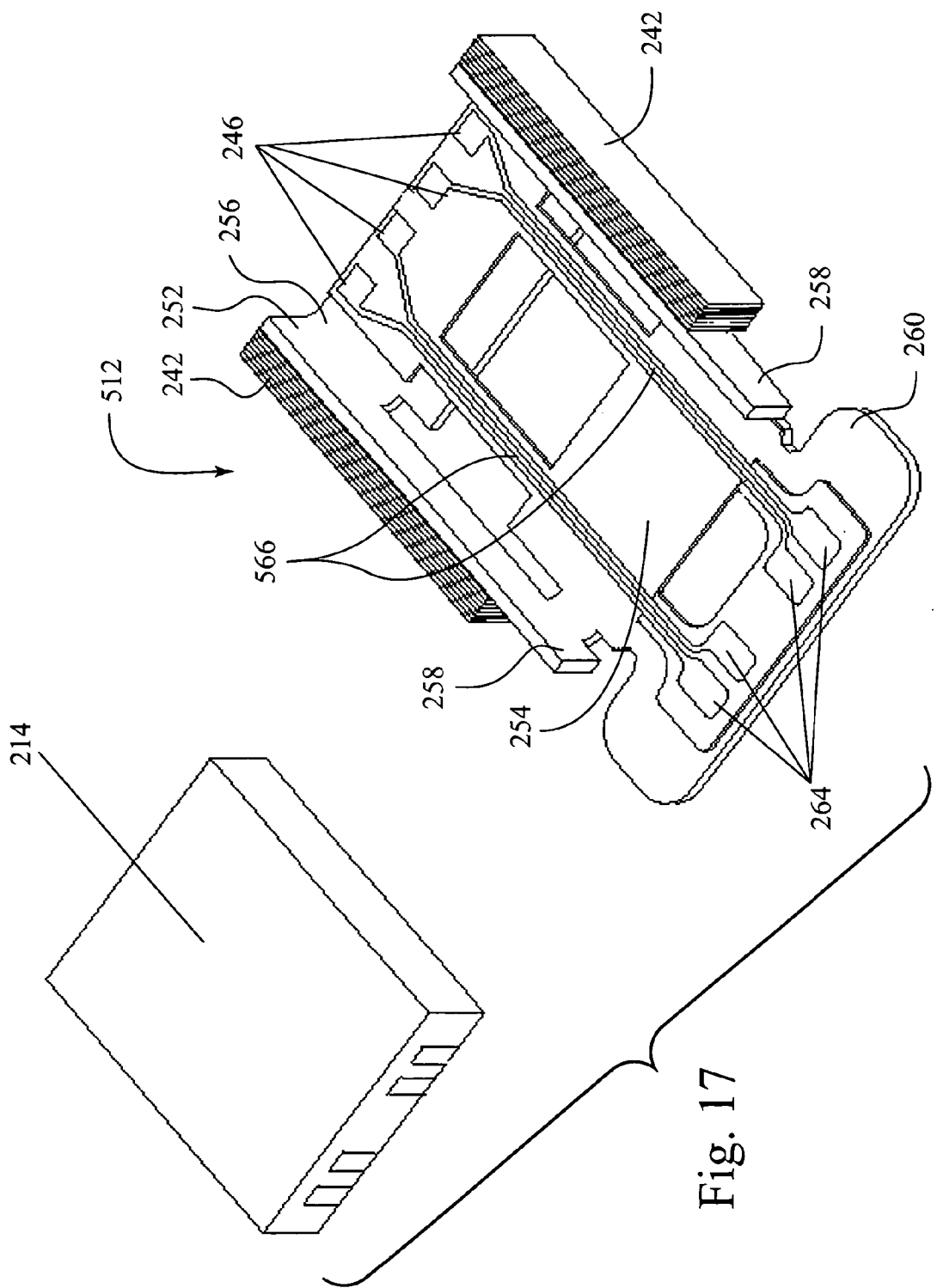
FIG. 17 is a perspective view of a slider and a PZT micro-actuator according to another embodiment of the present invention.

FIG. 17 illustrates a PZT micro-actuator 512 according to another exemplary embodiment of the present invention. In this embodiment, opposing trace lines of the traces 566 are substantially parallel with one another. The remaining components of the PZT micro-actuator 512 are substantially similar to the PZT micro-actuator 212 and indicated with similar reference numerals.

Figure 18:
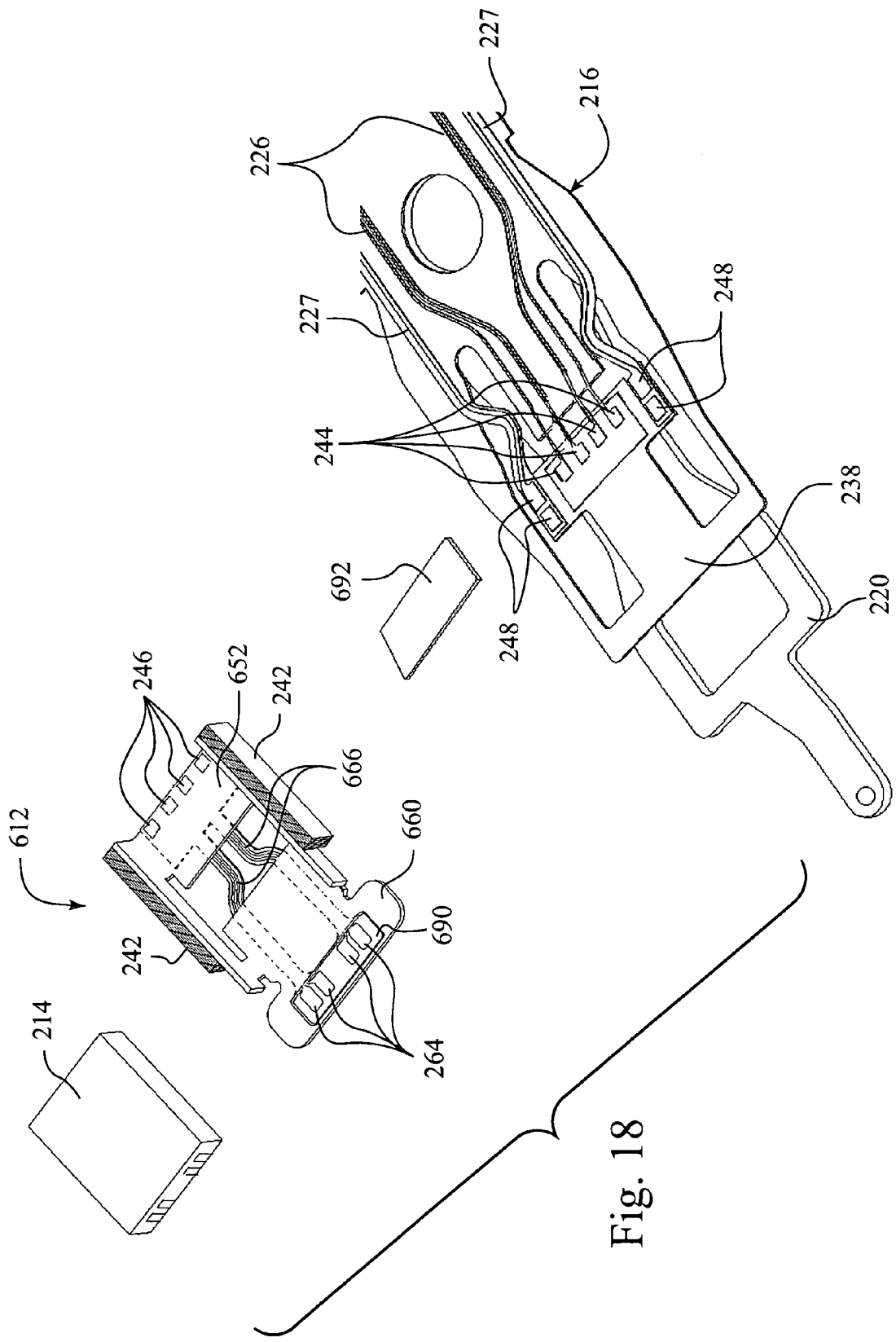
FIG. 18 is an exploded view of a head gimbal assembly (HGA) including a PZT micro-actuator according to another embodiment of the present invention.

FIG. 18 illustrates a PZT micro-actuator 612 according to another exemplary embodiment of the present invention. In this embodiment, the traces 666 are provided on the back side of the frame 652. The traces 666 may have any suitable configuration as described above. As illustrated, an opening or window 690 is provided in the bonding pad support 660 in order to expose the slider bonding pads 264 for bonding with the slider 214. Also, ACF 692 or other suitable material may be used to physically and electrically couple the suspension bonding pads 246 to the pads 244 provided on the suspension 216. The remaining components of the PZT micro-actuator 612 are substantially similar to the PZT micro-actuator 212 and indicated with similar reference numerals.

Figure 19:
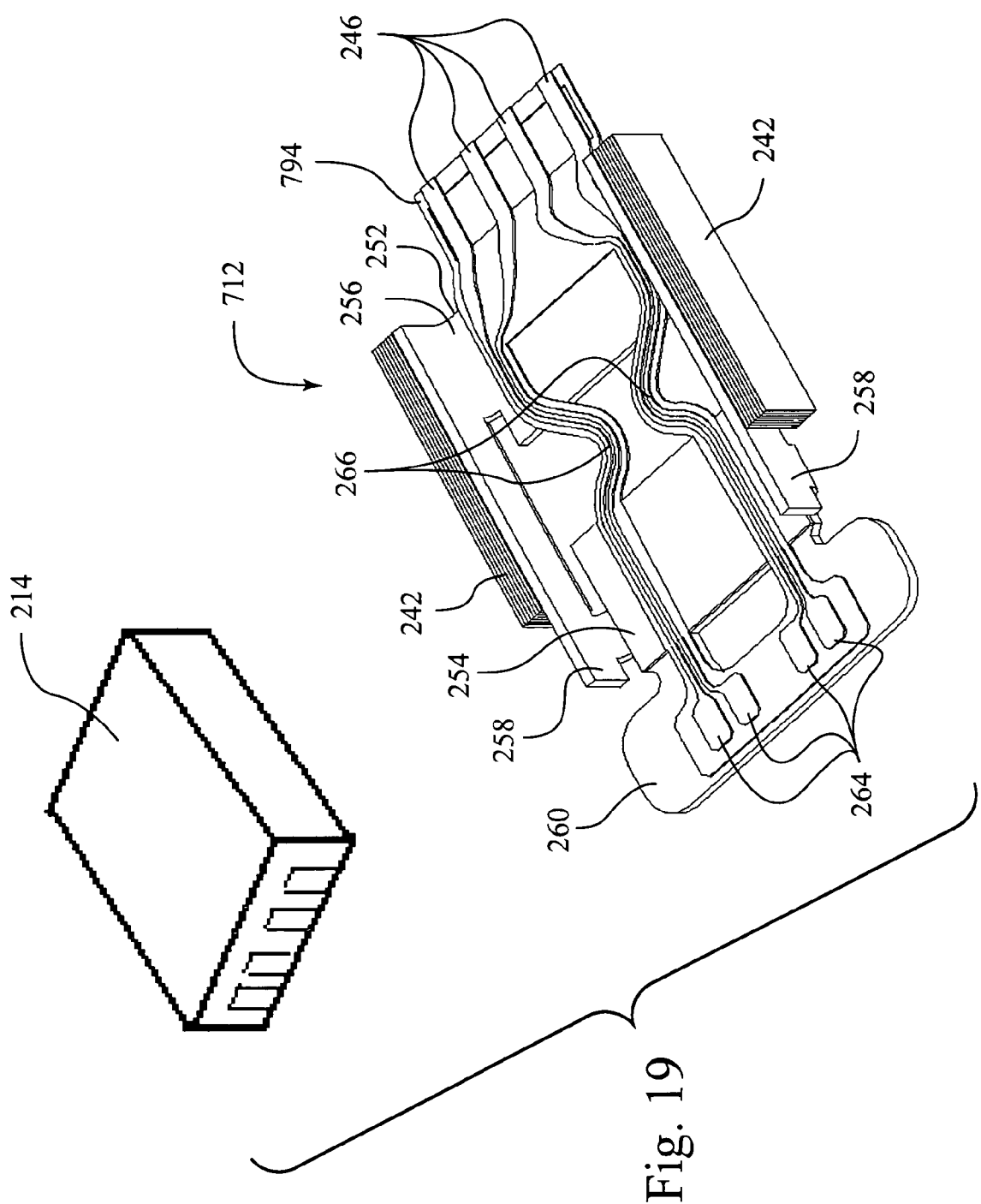
FIG. 19 is a perspective view of a slider and a PZT micro-actuator according to yet another embodiment of the present invention.
Figure 20:
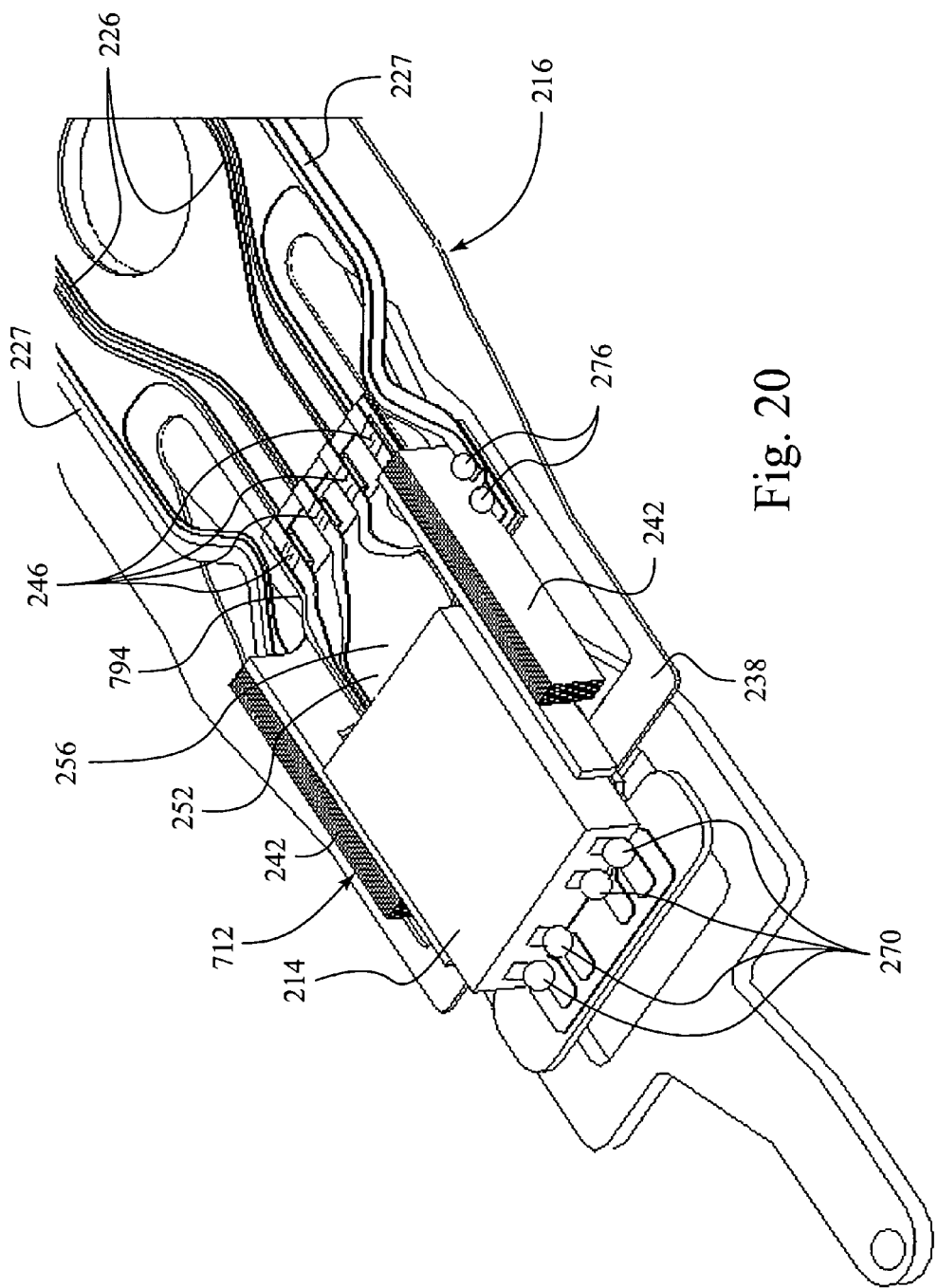
FIG. 20 is a perspective view of the slider and a PZT micro-actuator shown in FIG. 19 mounted to the suspension of a HGA.

FIGS. 19 and 20 illustrates a PZT micro-actuator 712 according to yet another exemplary embodiment of the present invention. In this embodiment, the bottom support 256 of the frame 252 may include an extension 794, e.g., long tail leader, to facilitate connection with the suspension 216. For example, the bottom support 256 may be physically mounted to the suspension tongue 238 of the suspension 216, e.g., by laser welding or epoxy. The extension 794, including the suspension bonding pads 246, may be electrically coupled to the pads 244 provided on the suspension 216, e.g., by US bonding. The remaining components of the PZT micro-actuator 712 are substantially similar to the PZT micro-actuator 212 and indicated with similar reference numerals.

Figure 21:
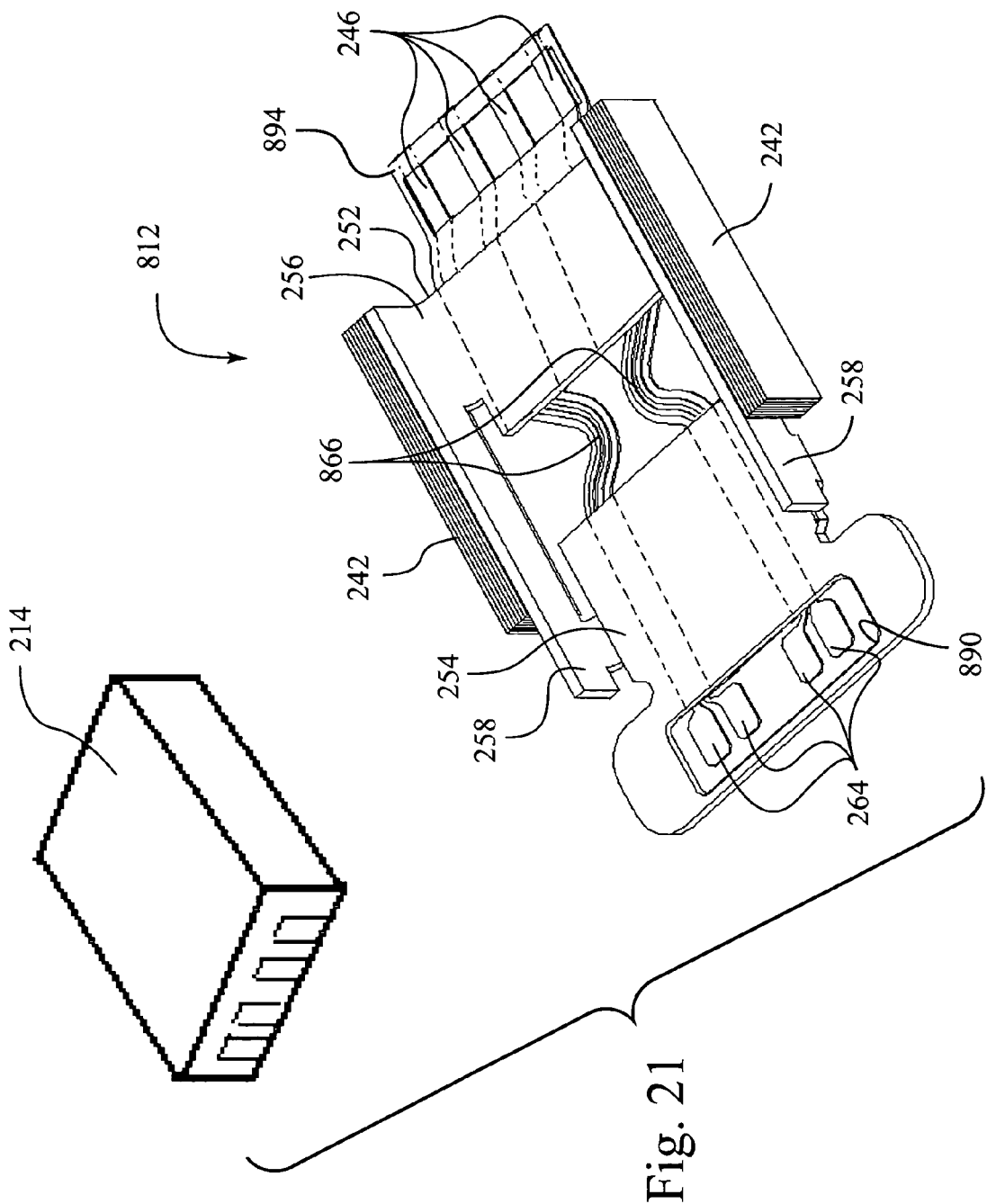
FIG. 21 is a perspective view of a slider and a PZT micro-actuator according to still another embodiment of the present invention.

FIG. 21 illustrate a PZT micro-actuator 812 according to still another exemplary embodiment of the present invention. In this embodiment, the bottom support 256 of the frame 252 may include an extension 894, e.g., long tail leader, to facilitate connection with the suspension 216 as described above. Further, the traces 866 interconnecting the slider bonding pads 264 and the suspension bonding pads 246 are provided on the back side of the frame 852. The traces 866 may have any suitable configuration as described above. As illustrated, an opening 890 is provided in the bonding pad support 860 in order to expose the slider bonding pads 264 for bonding with the slider 214. The remaining components of the PZT micro-actuator 812 are substantially similar to the PZT micro-actuator 212 and indicated with similar reference numerals.

A head gimbal assembly 210 incorporating a PZT micro-actuator 212, 312, 412, 512, 612, 712, 812 according to embodiments of the present invention may be provided to a disk drive device (HDD). The HDD may be of the type described above in connection with FIG. 1. Because the structure, operation and assembly processes of disk drive devices are well known to persons of ordinary skill in the art, further details regarding the disk drive device are not provided herein so as not to obscure the invention. The PZT micro-actuator can be implemented in any suitable disk drive device having a micro-actuator or any other device with a micro-actuator. In an embodiment, the PZT micro-actuator is used in a high RPM disk drive device.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A micro-actuator for a head gimbal assembly, comprising:
    a frame;
    a first set of bonding pads provided to one end of the frame and a second set of bonding pads provided to an opposing end of the frame; and
    a trace integrated to the frame, the trace interconnecting the first set of bonding pads and the second set of bonding pads,
    wherein the trace is substantially planar with respect to a single surface of the frame.

2. The micro-actuator according to claim 1, wherein the frame includes a bonding pad support integrated to the frame, the bonding pad support supporting one of the first set of bonding pads and the second set of bonding pads.

3. The micro-actuator according to claim 1, wherein the frame includes a bonding pad support integrated to the frame, the bonding pad support having at least one opening that supports and exposes one of the first set of bonding pads and the second set of bonding pads.

4. A micro-actuator for a head gimbal assembly, comprising:
    a bottom support adapted to be connected to a suspension of the head gimbal assembly, the bottom support including suspension bonding pads adapted to be electrically bonded with respective pads provided on the suspension;
    a top support adapted to support a slider of the head gimbal assembly;
    a pair of side arms that interconnect the bottom support and the top support;
    a PZT element mounted to each of the side arms, each PZT element being excitable to cause selective movement of the side arms which causes movement of the top support to cause movement of the slider; and
    a bonding pad support integrated to and extending from the top support, the bonding pad support including slider bonding pads adapted to be electrically bonded with respective pads provided on the slider,
    wherein the suspension bonding pads are electrically connected to the slider bonding pads through a trace that is integrated to the bottom support, the top support and the bonding pad support and supported only by the bottom support, the top support and the bonding pad support.

5. The micro-actuator according to claim 4, wherein the trace includes opposing trace lines having intermediate portions that curve inwardly towards one another.

6. The micro-actuator according to claim 4, wherein the trace includes opposing trace lines having intermediate portions that curve outwardly away from one another.

7. The micro-actuator according to claim 4, wherein the trace includes opposing trace lines having end portions that curve inwardly towards one another.

8. The micro-actuator according to claim 4, wherein the trace includes opposing trace lines that are substantially parallel with one another.

9. The micro-actuator according to claim 4, wherein the trace is integrated into a front surface of the bottom support, the top support, and the bonding pad support that faces towards the slider.

10. The micro-actuator according to claim 4, wherein the trace is integrated into a back surface of the bottom support, the top support, and the bonding pad support that faces away from the slider.

11. The micro-actuator according to claim 10, wherein the bonding pad support includes an opening that exposes the slider bonding pads so that the slider bonding pads can be electrically bonded with respective pads provided on the slider.

12. The micro-actuator according to claim 4, further comprising an extension integrated to and extending from the bottom support, the extension including suspension bonding pads adapted to be electrically bonded with respective pads provided on the suspension.

13. The micro-actuator according to claim 12, wherein the suspension bonding pads are electrically connected to the slider bonding pads through a trace that is integrated into the bottom support, the top support, the bonding pad support, and the extension.

14. The micro-actuator according to claim 13, wherein the trace includes opposing trace lines having intermediate portions that curve inwardly towards one another.

15. The micro-actuator according to claim 13, wherein the trace is integrated into a front surface of the bottom support, the top support, the bonding pad support, and the extension that faces towards the slider.

16. The micro-actuator according to claim 13, wherein the trace is integrated into a back surface of the bottom support, the top support, the bonding pad support, and the extension that faces away from the slider.

17. The micro-actuator according to claim 16, wherein the bonding pad support includes an opening that exposes the slider bonding pads so that the slider bonding pads can be electrically bonded with respective pads provided on the slider.

18. A head gimbal assembly comprising:
a micro-actuator;
a slider; and
a suspension that supports the micro-actuator and the slider,
wherein the micro-actuator includes:
a bottom support connected to the suspension by one of welding or epoxy bonding, the bottom support including suspension bonding pads adapted to be electrically bonded with respective pads provided on the suspension;
a top support to support the slider;
a pair of side arms that interconnect the bottom support and the top support;
a PZT element mounted to each of the side arms, each PZT element being excitable to cause selective movement of the side arms which causes movement of the top support to cause movement of the slider; and
a bonding pad support integrated to and extending from the top support, the bonding pad support including slider bonding pads that are electrically bonded with respective pads provided on the slider,
wherein the suspension bonding pads are electrically connected to the slider bonding pads through a trace that is integrated to the bottom support, the top support and the bonding pad support and supported only by the bottom support, the top support and the bonding pad support.

19. The head gimbal assembly according to claim 18, wherein the slider includes a read/write element for magnetic recording.

20. The head gimbal assembly according to claim 18, wherein the bottom support is connected to a suspension tongue of the suspension.

21. The head gimbal assembly according to claim 18, wherein the trace includes opposing trace lines having intermediate portions that curve inwardly towards one another.

22. The head gimbal assembly according to claim 18, wherein the trace includes opposing trace lines having intermediate portions that curve outwardly away from one another.

23. The head gimbal assembly according to claim 18, wherein the trace includes opposing trace lines having end portions that curve inwardly towards one another.

24. The head gimbal assembly according to claim 18, wherein the trace includes opposing trace lines that are substantially parallel with one another.

25. The head gimbal assembly according to claim 18, wherein the trace is integrated into a front surface of the bottom support, the top support, and the bonding pad support that faces towards the slider.

26. The head gimbal assembly according to claim 18, wherein the trace is integrated into a back surface of the bottom support, the top support, and the bonding pad support that faces away from the slider.

27. The head gimbal assembly according to claim 26, wherein the bonding pad support includes an opening that exposes the slider bonding pads so that the slider bonding pads can be electrically bonded with respective pads provided on the slider.

28. The head gimbal assembly according to claim 18, further comprising an extension integrated to and extending from the bottom support, the extension including suspension bonding pads adapted to be electrically bonded with respective pads provided on the suspension.

29. The head gimbal assembly according to claim 28, wherein the suspension bonding pads are electrically connected to the slider bonding pads through a trace that is integrated into the bottom support, the top support, the bonding pad support, and the extension.

30. The head gimbal assembly according to claim 29, wherein the trace includes opposing trace lines having intermediate portions that curve inwardly towards one another.

31. The head gimbal assembly according to claim 29, wherein the trace is integrated into a front surface of the bottom support, the top support, the bonding pad support, and the extension that faces towards the slider.

32. The head gimbal assembly according to claim 29, wherein the trace is integrated into a back surface of the bottom support, the top support, the bonding pad support, and the extension that faces away from the slider.

33. The head gimbal assembly according to claim 32, wherein the bonding pad support includes an opening that exposes the slider bonding pads so that the slider bonding pads can be electrically bonded with respective pads provided on the slider.

34. A disk drive device comprising:
a head gimbal assembly including a micro-actuator, a slider, and a suspension that supports the micro-actuator and slider;
a drive arm connected to the head gimbal assembly;
a disk; and
a spindle motor operable to spin the disk,
wherein the micro-actuator includes:
a bottom support connected to the suspension by one of welding or epoxy bonding, the bottom support including suspension bonding pads adapted to be electrically bonded with respective pads provided on the suspension;
a top support to support the slider;
a pair of side arms that interconnect the bottom support and the top support;
a PZT element mounted to each of the side arms, each PZT element being excitable to cause selective movement of the side arms which causes movement of the top support to cause movement of the slider; and
a bonding pad support integrated to and extending from the top support, the bonding pad support including slider bonding pads that are electrically bonded with respective pads provided on the slider,
wherein the suspension bonding pads are electrically connected to the slider bonding pads through a trace that is integrated to the bottom support, the top support and the bonding pad support and supported only by the bottom support, the top support and the bonding pad support.

35. A micro-actuator frame for a head gimbal assembly, comprising:
a bottom support adapted to be connected to a suspension of the head gimbal assembly;
a top support adapted to support a slider of the head gimbal assembly;
a pair of side arms that interconnect the bottom support and the top support;
a first set of bonding pads provided to the bottom support and a second set of bonding pads provided to the top support; and
a trace integrated to the bottom support and the top support, supported only by the bottom support and the top support, and laminated between the side arms, the trace interconnecting the first set of bonding pads and the second set of bonding pads.

36. The micro-actuator frame according to claim 35, further comprising a bonding pad support integrated to and extending from the top support, the bonding pad support supporting the second set of bonding pads.

37. The micro-actuator frame according to claim 35, wherein the trace includes opposing trace lines having end portions that curve inwardly towards one another, the end portions that curve inwardly towards one another being laminated on the bottom support.

* * * * *